United States Patent Office 3,524,915
Patented Aug. 18, 1970

3,524,915
SYNERGISTIC INSECTICIDAL CARBAMATES WITH 3,4 - METHYLENEDIOXYPHENYL-3-HALO-2-PROPYNYL ETHERS
Josef Fellig, Glen Rock, and Albert Israel Rachlin, Verona, N.J., assignors to Hoffmann-La Roche Inc., Nutley, N.J., a corporation of New Jersey
No Drawing. Continuation-in-part of application Ser. No. 531,371, Mar. 3, 1966. This application Sept. 16, 1968, Ser. No. 760,057
Int. Cl. A01n 9/02, 9/24
U.S. Cl. 424—282                13 Claims

ABSTRACT OF THE DISCLOSURE

Synergistic insecticidal compositions comprising a compound of the formula

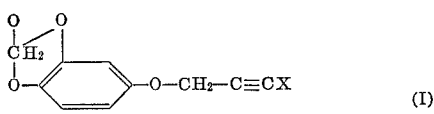
(I)

wherein X represents hydrogen, iodine, bromine or chlorine, together with an insecticidal carbamate are disclosed.

RELATED APPLICATIONS

This application is a continuation-in-part of U.S. patent application Ser. No. 531,371, filed Mar. 3, 1966, by Fellig et al., now U.S. Pat. 3,423,428.

SUMMARY OF THE INVENTION

This invention relates to synergistic insecticidal compositions comprising a compound of the formula

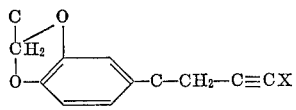

wherein X represents hydrogen, iodine, bromine, or chlorine, together with an insecticidal carbamate as well as to methods of killing insects by contacting them with the novel synergistic insecticidal compositions.

DETAILED DESCRIPTION

The 3,4-methylenedioxyphenyl-2-propyl ether compounds used in this invention can be obtained via a number of alternative preparative routes. They can, for example, be prepared by condensing 3,4-methylenedioxyphenol with 1-halo-2-propynyl ether to form 3,4-methylenedioxyphenyl-2-propynyl ether which is, in turn, halogenated by any of the usual methods for halogenating acetylenic carbons to form the corresponding 3-iodo, 3-bromo and 3-chloro derivatives. Alternatively, the halogenated end products can be obtained directly by condensing 3,4-methylenedioxyphenol with the appropriate 1,3-dihalo-2-propyne.

These compounds are useful as an active ingredient in the novel insecticidal compositions of this invention. Said novel compositions consist essentially of a carbamate insecticide and a methylenedioxyphenylpropynyl ether of Formula I above. As the carbamate portion of the composition of this invention, there can be utilized any of the known insecticidal carbamates. The term "insecticidal carbamate" is a term well recognized by those skilled in the insecticidal art and encompasses a variety of carbocyclic and heterocyclic carbamates of which the following exemplary compounds are particularly well suited to the novel compositions of this invention; 1-naphthyl-N-methylcarbamate, 4-(N,N-dimethylamino)-3,5-xylyl - N-methylcarbamate, 1-isopropyl-3-methylpyrazolyl - 5 - dimethylcarbamate, O-isopropoxyphenyl N-methylcarbamate, benzo[b]thien-4-yl N-methylcarbamate, 2-isopropylphenyl N-methylcarbamate.

The present invention comprises a method of killing insects by contacting them with the novel synergistic insecticidal compositions of this invention. According to the present invention, it has been found that the carbamate insecticides and particularly those carbamate insecticides listed above in combination with a 3,4-methylenedioxyphenyl-2-propynyl ether of Formula I and especially the compound 3,4-methylenedioxyphenyl-2-propynyl ether provide an insecticide of greatly enhanced activity. Said combination provides both a qualitative and a quantitative improvement over the additive effect of the two ingredients.

The exact proportions of the two components of the novel synergistic compositions of this invention as an insecticidal formulation will vary with the type of use for which the insecticide is to be employed, the methods of application, the nature of the insects to be controlled and other factors encountered in the insecticidal art. The ratio of ingredients, i.e., carbamate to propynyl ether can vary between wide limits. Practical considerations however limit the amount of the propynyl ether used to about 0.5 to about 5 parts by weight per part of carbamate present in the composition. The total concentration of the combined ingredients in a final insecticidal composition will vary with the form of application and type of use. The compositions of this invention can be formulated, for example, as concentrates or as granules or with carriers as sprays, aerosols or dusts. For some purposes, it is preferred that the carrier include emulsions, solutions or organic solvents as well as ancillary suspending and wetting agents. Solid carriers may also be employed including chalk, talc, bentonite, kaolin, diatomaceous earth, silica, fuller's earth, lime, gypsum, flour and similar powders. The compositions may also contain other additives such as emulsifying agents, wetting agents, and masking agents, etc. or they can be combined with other known insecticides such as pyrethrins, etc. In general, the techniques used in formulating insecticidal compositions of 1-naphthyl-N-methyl-carbamate as described in Farm Chemicals, volume 128, page 52 et seq. can also be employed in formulating insecticidal combinations of the present invention.

The compositions of this invention may be concentrates suitable for storage or transport containing, for example, from about 40 to about 80% by weight of the novel synergistic combination. Such concentrates can be diluted with the same or a different carrier to a concentration suitable for application. In particular, concentrations of about 2 to about 20% by weight of the active material based on the total weight of the composition are satisfactory for application, though higher or lower concentrations can be applied depending upon the mode of the application. The synergistic combinations of this invention are operative in destroying insects by any of the usual techniques such as contact, ingestion and the like. They can be applied as a single composition or, alternatively, the individual components can be applied serially in any order at time intervals of up to about 8 hours or longer.

In the form in which applied the concentrations of active ingredients and the vehicles are adjusted so that flying insects are exposed to lethal amounts of space sprays or aerosols and crawling, chewing and hopping insects are exposed to surfaces that have been coated with lethal amounts of the composition in dusts or in spray form. The novel compositions are active against a wide variety of insects. They are active, for example, against Diptera such as house flies, fruit flies, mosquitoes, stable flies, face flies, etc.; Lepidoptera such as cabbage loopers, spruce budworms, gypsy moths, corn earworms, army worms, etc. and Coleoptera such as alfalfa weevils, flour beetles, etc.

The following tables exemplify the results obtained in experiments using direct topical application of typical synergistic compositions of this invention. The test consists in the topical application to house flies of specified amounts of a synergistic composition according to the invention in a standard volume of acetone (1 mcl.). Only adult female flies 4 to 5 days old are used for testing. Three replicates of ten flies each are used for each compound and each concentration, the testing is done as follows: a cage of flies holding approximately 500 individual flies is briefly exposed to an atmosphere of carbon dioxide in a specially constructed chamber to anesthetize the insects. They are then transferred to several porcelain table-type Buchner funnels through which a slow stream of carbon dioxide is maintained and they are then sorted out by sex, the males being discarded. Ten female flies are placed on a filter paper, positioned in the top of a disposable plastic petri dish (diameter 100 mm., height 20 mm.). A cotton wick soaked with reconstituted non-fat powdered milk is placed into the dish to serve as a source of moisture and food. Exactly 1.0 mcl. of acetone solution of the test compound as measured by an ISCO micro-applicator is applied to the thoracic region of each fly (the micro-applicator which is available commercially from Instrumentation Specialties Company, Lincoln, Nebr., is essentially a synchronous, motor driven micro-syringe with a timed relay). After the application of the test solution, the bottom of the petri dish, into which about 10 small holes had been pierced to allow for air circulation, is placed in position. The assembled petri dishes holding the test insects are then placed in a holding room at 78 to 80° F. for a period of 24 hours. Knockdown is checked at short time intervals for up to 4 hours following application mortality is checked at 24 hours at which time the test is terminated. Untreated and acetone-treated controls are included with all series.

TABLE I.—INSECTICIDAL ACTIVITY OF INSECTICIDAL CARBAMATE - 3,4 - METHYLENEDIOXYPHENYL 2-PROPYNYL ETHER COMPOSITIONS

| 3,4-methylenedioxyphenyl 2-propynyl ether (mcg./fly) | 1-naphthyl-N-methyl carbamate (mcg./fly) | Percent kill |
|---|---|---|
| 10.0 | | 0 |
| | 10.0 | 0 |
| 1.0 | 0.2 | 83 |
| 2.0 | 0.4 | 100 |
| | 1-isopropyl-3-methylpyrazolyl-5-dimethylcarbamate | |
| | 0.5 | 0 |
| | 1.0 | 0 |
| | 2.0 | 20 |
| | 3.0 | 50 |
| | 6.0 | 100 |
| 0.5 | 0.1 | 50 |
| 1.0 | 0.2 | 90 |
| 2.0 | 0.4 | 100 |
| | 4-(N,N-dimethylamino)-3,5-xylyl N-methylcarbamate (mcg./fly) | |
| | 0.4 | 0 |
| | 0.8 | 15 |
| | 1.0 | 43 |
| | 2.0 | 100 |
| 0.5 | 0.1 | 0 |
| 1.0 | 0.2 | 70 |
| 2.5 | 0.5 | 100 |
| | O-isopropoxyphenyl N-methylcarbamate (mcg./fly) | |
| | 0.2 | 15 |
| | 0.4 | 58 |
| | 0.8 | 93 |
| | 1.6 | 100 |
| 0.05 | 0.01 | 0 |
| 0.1 | 0.02 | 23 |
| 0.2 | 0.04 | 73 |

TABLE I.—Continued

| 3,4-methylenedioxyphenyl 2-propynyl ether (mcg./fly) | 1-naphthyl-N-methyl carbamate (mcg./fly) | Percent kill |
|---|---|---|
| | Benzo[b]thien-4-yl N-methylcarbamate (mcg./fly) | |
| | 0.2 | 20 |
| | 0.3 | 27 |
| | 0.4 | 53 |
| | 0.8 | 80 |
| 0.2 | 0.04 | 10 |
| 0.4 | 0.08 | 80 |
| | 2-isopropylphenyl N-methylcarbamate (mcg./fly) | |
| | 1.0 | 13 |
| | 2.0 | 80 |
| | 4.0 | 97 |
| 0.25 | 0.05 | 7 |
| 0.5 | 0.1 | 73 |
| 1.0 | 0.2 | 100 |

TABLE II.—INSECTICIDAL ACTIVITY OF INSECTICIDAL CARBAMATE-3,4-METHYLENEDIOXYPHENYL 3-IODO-2-PROPYNYL ETHER COMPOSITIONS

| 3,4-methylenedioxyphenyl 3-iodo-2-propynyl ether (mcg./fly) | 1-naphthyl-N-methyl-carbamate (mcg./fly) | Percent kill |
|---|---|---|
| 1.0 | 0.2 | 83 |
| 2.0 | 0.4 | 710 |

The examples which follow illustrate the preparation of the compounds useful in the novel compositions of this invention which are prepared according to the methods described above. All temperatures stated are in degrees centigrade.

Example 1.—Preparation of 3,4-methylenedioxyphenyl 2-propynyl ether

To a 500 ml. 3-neck round bottom flask equipped with a stirrer and a reflux condenser were charged 50 g. (0.36 mole) of 3,4-methylenedioxyphenol (sesamol), 46.4 g. (0.39 mole) of 3-bromopropyne, 55 g. (0.39 mole) of potassium carbonate, and 350 ml. of acetone. After the reaction mixture was stirred and refluxed for 8 hours, the solids were filtered and the filtrate was evaporated at 60° under reduced pressure. The residue was distilled under a pressure of 0.05 mm. at 88° to yield 3,4-methylenedioxyphenyl 2-propynyl ether.

Example 2.—Preparation of 3,4-methylenedioxyphenyl 3-iodo-2-propynyl ether

To a 250 ml. 3-neck round bottom flask equipped with a stirrer, a dropping funnel, and a thermometer were charged 8.0 g. (0.04 mole) of 3,4-methylenedioxy 2-propynyl ether and 50 ml. of methanol. To the vigorously stirred solution were added simultaneously 11.2 g. (0.044 mole) of iodine, in small portions and 35 ml. of a 10% aqueous solution of sodium hydroxide (0.088 mole) dropwise over a period of 15 minutes while the reaction temperature was kept between 20 and 25° by means of an ice-water bath. After stirring for 1 hour longer at room temperature, the reaction mixture was diluted with 100 ml. of water and chilled with an ice-water bath. The crystals which formed were filtered and dried in a vacuum oven at 60° to yield 3,4-methylenedioxyphenyl 3-iodo-2-propynyl ether, M.P. 71–73°.

We claim:

1. A synergistic insecticidal composition consisting essentially of an insecticidal carbamate and 1 to 5 parts of a compound of the formula

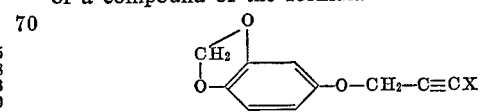

wherein X represents hydrogen, iodine, bromine and chlorine, per part by weight of said insecticidal carbamate and an inert carrier material.

2. An insecticidal composition according to claim 1 wherein said insecticidal carbamate is 1-naphthyl N-methylcarbamate.

3. An insecticidal composition according to claim 1 wherein said insecticidal carbamate is 4-(N,N-dimethylamino)-3,5-xylyl-N-methylcarbamate.

4. An insecticidal composition according to claim 1 wherein said insecticidal carbamate is 1-isopropyl-3-methylpyrazolyl-5-dimethylcarbamate.

5. An insecticidal composition according to claim 1 wherein said insecticidal carbamate is O-isopropoxyphenyl N-methylcarbamate.

6. An insecticidal composition according to claim 1 wherein said insecticidal carbamate is benzo[b]thien-4-yl N-methylcarbamate.

7. An insecticidal composition according to claim 1 wherein said insecticidal carbamate is 2-isopropylphenyl N-methylcarbamate.

8. An insecticidal composition comprising 1-naphthyl N-methylcarbamate and 1 to 5 parts of 3,4-methylenedioxyphenyl 2-propynyl ether per part by weight of said 1-naphthyl N-methylcarbamate.

9. An insecticidal composition comprising 4-(N,N-dimethylamino)-3,5-xylyl-N-methylcarbamate and 1 to 5 parts of 3,4-methylenedioxyphenyl 2-propynyl ether per part by weight of said 4-(N,N-dimethylamino)-3,5-xylyl-N-methylcarbamate.

10. An insecticidal composition comprising 1-isopropyl-3-methylpyrazolyl-5-dimethylcarbamate and 1 to 5 parts of 3,4-methylenedioxyphenyl 2-propynyl ether per part by weight of said 1-isopropyl-3-methylpyrazolyl-5-dimethylcarbamate.

11. An insecticidal composition comprising O-isopropoxyphenyl-N methylcarbamate and 1 to 5 parts of 3,4-methylene dioxyphenyl 2-propynyl ether per part by weight of said O-isopropoxyphenyl N-methylcarbamate.

12. An insecticidal composition comprising benzo[b]thien-4-yl N methylcarbamate and 1 to 5 parts of 3,4-methylenedioxyphenyl 2-propynyl ether per part by weight of said benzo[b]thien-4-yl N-methylcarbamate.

13. An insecticidal composition comprising 2-isopropylphenyl N-methylcarbamate and 1 to 5 parts of 3,4-methylenedioxyphenyl 2-propynyl ether per part by weight of said 2-isopropylphenyl N-methylcarbamate.

References Cited

UNITED STATES PATENTS 3,362,871  1/1968  Fellig et al. _____ 424—300 XR
3,423,428  1/1969  Fellig et al. _____ 424—282 XR SHEP K. ROSE, Primary Examiner

UNITED STATES PATENT OFFICE
CERTIFICATE OF CORRECTION

Patent No. 3,524,915          Dated August 18, 1970

Inventor(s)   Fellig and Rachlin

It is certified that error appears in the above-identified patent and that said Letters Patent are hereby corrected as shown below:

Column 1, lines 17-21

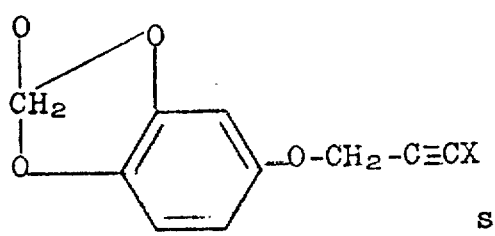          should be          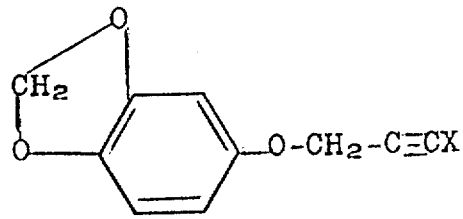

Column 1, lines 35-40

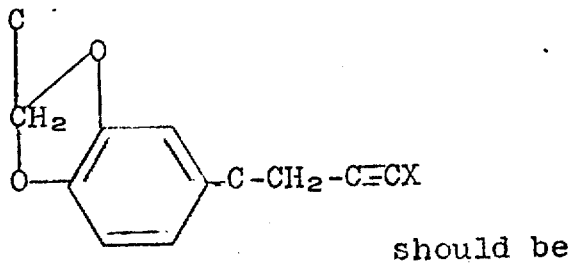          should be          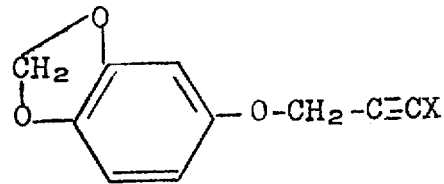

PO-1050
(5/69)

UNITED STATES PATENT OFFICE
CERTIFICATE OF CORRECTION

Patent No. 3,524,915        Dated _____

Inventor(s) _____

It is certified that error appears in the above-identified patent and that said Letters Patent are hereby corrected as shown below:

Column 4, line 29 in Table II under Percent kill reads "710"     should be

100

SIGNED AND SEALED

JAN 12 1971

(SEAL)
Attest:

Edward M. Fletcher, Jr.
Attesting Officer

WILLIAM E. SCHUYLER, JR.
Commissioner of Patents